(12) United States Patent
Noh et al.

(10) Patent No.: US 9,029,032 B2
(45) Date of Patent: May 12, 2015

(54) APPARATUS FOR CONTROLLING HYDROGEN SUPPLY OF FUEL CELL SYSTEM AND METHOD FOR CONTROLLING THE SAME

(75) Inventors: Yong Gyu Noh, Gyeonggi-do (KR); Se Kwon Jung, Gyeonggi-do (KR); Ho June Bae, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 537 days.

(21) Appl. No.: 13/291,296

(22) Filed: Nov. 8, 2011

(65) Prior Publication Data

US 2012/0315559 A1     Dec. 13, 2012

(30) Foreign Application Priority Data

Jun. 9, 2011    (KR) ................ 10-2011-0055814

(51) Int. Cl.
| | |
|---|---|
| *H01M 8/04* | (2006.01) |
| *F02M 63/00* | (2006.01) |
| *B60L 1/00* | (2006.01) |
| *B60L 11/18* | (2006.01) |
| *F02D 41/00* | (2006.01) |

(52) U.S. Cl.
CPC ........ *H01M 8/04097* (2013.01); *F02D 41/0027* (2013.01); *H01M 8/04992* (2013.01); *H01M 8/04388* (2013.01); *H01M 8/04604* (2013.01); *H01M 8/04619* (2013.01); *H01M 8/04798* (2013.01); *H01M 2250/20* (2013.01); *F02M 63/0017* (2013.01); *B60L 1/003* (2013.01); *B60L 11/1898* (2013.01); *Y02E 60/50* (2013.01); *Y02T 90/16* (2013.01); *Y02T 90/34* (2013.01); *Y02T 90/32* (2013.01)

(58) Field of Classification Search
USPC .................................. 429/431, 444
See application file for complete search history.

(56) References Cited

U.S. PATENT DOCUMENTS

| | | | |
|---|---|---|---|
| 7,971,538 B1 * | 7/2011 | Miller et al. ................. | 105/50 |
| 2004/0038100 A1 * | 2/2004 | Cargnelli et al. ............ | 429/26 |
| 2007/0190389 A1 | 8/2007 | Hinsenkamp et al. | |
| 2007/0248858 A1 * | 10/2007 | Blaszczyk et al. .......... | 429/25 |
| 2009/0000673 A1 | 1/2009 | Ramamurthy | |

FOREIGN PATENT DOCUMENTS

| | | | | |
|---|---|---|---|---|
| KR | 10-0727786 | 6/2007 | | |
| KR | 10-0864003 | 10/2008 | | |
| KR | 20100069833 A | * 6/2010 | ............. | F16K 31/06 |

* cited by examiner

*Primary Examiner* — Cynthia H Kelly
*Assistant Examiner* — Monique Wills
(74) *Attorney, Agent, or Firm* — Mintz Levin Cohn Ferris Glovsky and Popeo, P.C.; Peter F. Corless

(57) ABSTRACT

The present invention provides an apparatus for controlling hydrogen supply of a fuel cell system and a method for controlling the same. The apparatus includes a jet pump, a proportional control solenoid valve, and a controller. The jet pump is disposed at the side of an inlet of a fuel cell stack and performs supply and recirculation of hydrogen into the fuel cell stack. The proportional control solenoid valve is connected to a hydrogen supply line and fluidly communicates with a nozzle inlet of the jet pump to control the hydrogen supply to the jet pump. The controller controls an operation of the proportional control solenoid valve according to a power of the fuel cell system. Here, the controller controls the operation of the proportional control solenoid valve according to a pulse flow control method at a low power section in which a current power is lower than a predetermined reference power.

6 Claims, 8 Drawing Sheets

APPARATUS FOR CONTROLLING HYDROGEN SUPPLY OF FUEL CELL SYSTEM AND METHOD FOR CONTROLLING THE SAME

CROSS-REFERENCE TO RELATED APPLICATION

This application claims under 35 U.S.C. §119(a) the benefit of Korean Patent Application No. 10-2011-0055814 filed Jun. 9, 2011, the entire contents of which are incorporated herein by reference.

BACKGROUND (a) Technical Field

The present invention relates to an apparatus for controlling hydrogen supply of a fuel cell system and a method for controlling the same. More particularly, it relates to an apparatus for controlling hydrogen supply of a fuel cell system and a method for controlling the same, which can achieve a function of controlling hydrogen supply flow and anode recirculation performance necessary for a fuel cell in conjunction with a jet pump, by utilizing the flow control characteristics of a proportional control solenoid valve for control of hydrogen fuel supply to a fuel cell stack, and controlling the operation of the proportional control solenoid valve using a pulse flow control method together with a proportional control method.

(b) Background Art

A fuel cell system, a type of power generating system that can convert chemical energy into electrical energy, includes a fuel cell stack which is configured to generate electrical energy, a fuel supply system for supplying fuel (hydrogen) to the fuel cell stack, an air supply system for supplying an oxidant (oxygen) necessary for an electrochemical reaction to the fuel cell stack, and a cooling system for discharging reaction heat out of the system and controlling the operation temperature of the fuel cell stack.

Referring to FIG. 7, a fuel supply system connected to a fuel cell stack includes a hydrogen supply line 12 connected to a hydrogen storage tank 10, a hydrogen recirculation line 14 for recirculating unreacted hydrogen in the fuel cell stack, and a jet pump (i.e., an ejector) 16 installed at a point where a stack inlet 13 and the hydrogen recirculation line 14 intersect and configured to pump new hydrogen and recirculated hydrogen to an anode of the fuel cell stack. A stack inlet pressure sensor 18 installed at the stack inlet is configured to measure the pressure of hydrogen and air, and an ECU 22 is configured to control the flow control operation of a regulator 20 installed in the hydrogen supply line based on a signal detected and received from the stack inlet pressure sensor 18. The jet pump 16 may generate a vacuum by injecting compressed hydrogen supplied from a high pressure tank through a nozzle and may also recirculate hydrogen gas by suctioning exhaust gas in the fuel cell stack. Additionally, the system also includes a purge valve 25 connected to the recirculating line 14 for releasing excess hydrogen from the system.

Alternatively, as shown in FIG. 8, a blower 24 may be disposed in the hydrogen recirculation line 14 instead of the jet pump 16 as a mechanism or device for recirculating hydrogen.

Thus, in a conventional fuel cell vehicle, a blower or a jet pump may be used for smooth hydrogen fuel supply and recirculation. The objectives of hydrogen recirculation achieved by such a configuration lie in improving the system efficiency through fuel supercharging into an anode channel of a stack, improving the humidification efficiency by reloading humidified gas of a stack outlet into an stack inlet, improving flow uniformity in the stack according to an increase of the flow of the stack anode, and smooth supply of hydrogen gas fuel to a Membrane Electrode Assembly (MEA) through condensation water discharge of the stack anode.

On the other hand, in a system which adopts a blower like the one shown in FIG. 8, to recirculation hydrogen, must be equipped with a motor which is expensive, and bearings and other parts which may be easily corroded by condensation water of hydrogen recirculation gas thus, causing the blower to become corrupted. Particularly, when water form from condensation is frozen, it may cause a rotor in the blower to seize, thereby requiring the rotor to be melted by a heater.

Furthermore, a jet pump, as shown in FIG. 7, cannot generate a required recirculation flow due to a limitation of recirculation hydrogen fuel which is an energy source that can be used when a system load is small. That is, the jet pump is not able to generate the required recirculation flow when the load on the overall system is low due to the lack of hydrogen supplied to the system by the small load. That is, as shown in FIG. 9A, as hydrogen fuel flow (indicated as an arrow) supplied to a jet pump nozzle increases, the flow and pressure generated by the jet pump increase. Also, a crossing point between the flow of recirculated hydrogen and the system pressure drop curve corresponds to an operation point of actual hydrogen recirculation generated.

Regarding the hydrogen suctioning performance of a jet pump according to an increase of hydrogen fuel at a certain pressure, as shown in FIG. 9B, when the flow supply through a nozzle of the jet pump is small, the hydrogen injection pressure is low at the nozzle, and the flow velocity is significantly decreased. Accordingly, the suctioning pressure is not significant at this point, and thus the hydrogen recirculation flow suctioned by the jet pump is also reduced.

Accordingly, when there is a low load applied to the fuel cell system, thus requiring only a small amount of fuel to be used, the recirculation flow is not sufficient under the above operating conditions, and thus the operation state of the stack channel becomes worsened. Also, the stack efficiency and durability may become worsened as a result as well.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an apparatus for controlling hydrogen supply of a fuel cell system and a method for controlling the same, which can secure a sufficient level of hydrogen recirculation flow even in lower power fuel application situations in a typical recirculation system using an ejector.

The present invention also provides an apparatus for controlling hydrogen supply of a fuel cell system and a method for controlling the same, which can secure a required amount of recirculation flow by applying a simple configuration without a blower or other recirculation parts that are added to solve deficiency of the hydro recirculation flow during low power fuel applications in a typical recirculation system using an ejector The present invention also provides an apparatus for controlling hydrogen supply of a fuel cell system and a method for controlling the same, which can improves the efficiency of a jet pump during low power fuel applications, by installing a proportional control solenoid on a hydrogen supply line connection part of the jet pump.

The present invention also provides an apparatus for controlling hydrogen supply of a fuel cell system and a method for controlling the same, which can provide a comfortable driving mode by removing noise that may be generated as a result of on/off control of a valve during a low power fuel application.

In one aspect, the present invention provides an apparatus for controlling hydrogen supply of a fuel cell system, including: a jet pump disposed at the side of an inlet of a fuel cell stack and performing supply and recirculation of hydrogen into the fuel cell stack; a proportional control solenoid valve connected to a hydrogen supply line and communicating with a nozzle inlet of the jet pump to control the hydrogen supply to the jet pump; and a controller for controlling an operation of the proportional control solenoid valve according to a power of the fuel cell system, wherein the controller controls the operation of the proportional control solenoid valve according to a pulse flow control method at a low power section in which a current power is lower than a predetermined reference power.

In a preferred exemplary embodiment, the controller may control the operation of the proportional control solenoid valve according to a proportional control method during a high power fuel application in which the current power is higher than the predetermined reference power.

In another preferred exemplary embodiment, the control during the high power fuel application may be performed by a proportional integral derivative control (PID) pressure control that performs the control by calculating a difference between a target pressure for the hydrogen supply and a stack inlet pressure In still another preferred exemplary embodiment, the control at the low power section may include controlling a fuel supply by applying a peak current and a hold current to the proportional control solenoid valve according to a peak and hold control method.

In yet another preferred exemplary embodiment, in the control performed at the low power section by the peak and hold control method, the fuel supply may be controlled by changing at least one of a peak current value, a peak current application time, a hold current value, and a hold current application time.

In still yet another preferred exemplary embodiment, the proportional control solenoid valve may include a valve plunger that operates in a gravitational direction, and a noise-absorbing member may be added to a lower end of the valve plunger or a valve body colliding with the valve plunger.

In another aspect, the present invention provides a method for controlling a hydrogen fuel supply control apparatus for a fuel cell system, including: initiating hydrogen supply to a fuel cell stack; detecting a current power of the fuel cell system to compare the current power with a predetermined reference power; and determining a method of controlling a proportional control solenoid valve according to a result of the comparison and controlling an operation of the proportional control solenoid valve by a controller, wherein the controlling of the operation of the proportional control solenoid valve includes controlling the operation of the valve by a pulse flow control method during a low power application in which the current power is lower than the reference power and controlling the operation of the valve by a proportional control method during a high power application in which the current power is higher than the reference power.

In a preferred exemplary embodiment, in the controlling of the operation of the proportional control solenoid valve, the controlling at the low power application may include controlling a fuel supply by applying a peak current and a hold current to the proportional control solenoid valve according to a peak and hold control method.

In another preferred exemplary embodiment, the peak and hold control method may include reducing noise by controlling a magnitude and an application time of a hold current value to divide the falling of a valve plunger into a plurality of stages and thus reducing an impulse generated by a collision at the bottom dead center.

In still another preferred exemplary embodiment, the peak and hold control method may include reducing noise by controlling a magnitude and an application time of a peak current value to control the position of a top dead center of a valve plunger and thus preventing a collision at the top dead center.

In yet another preferred exemplary embodiment, in the controlling of the operation of the proportional control solenoid valve, controlling during a low power application/instance may further include comparing a measured hydrogen supply pressure with a predetermined target pressure, and controlling the operation of the valve by the pulse flow control method when the measured pressure is less than the target pressure and closing the proportional control solenoid valve when the measured pressure is greater than the target pressure.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
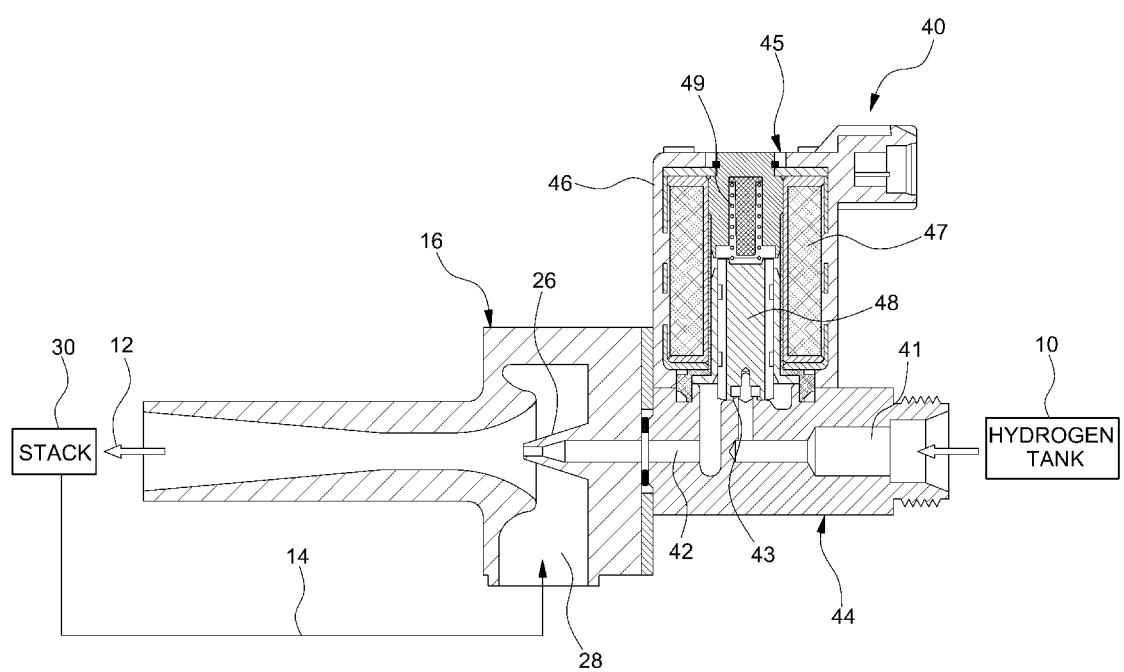
FIG. 1 is a cross-sectional view illustrating a jet pump and a proportional control solenoid valve of an apparatus for controlling hydrogen supply of a fuel cell system according to an exemplary embodiment of the present invention.

Reference numerals set forth in the Drawings includes reference to the following elements as further discussed below:

- 10: hydrogen storage tank
- 12: hydrogen supply line
- 14: hydrogen recirculation line
- 16: jet pump
- 18: stack inlet pressure sensor
- 20: regulator
- 22: ECU
- 24: blower
- 25: purge valve
- 26: nozzle
- 28: recirculation hydrogen inlet
- 30: stack
- 40: proportional control solenoid valve
- 41: inlet
- 42: outlet
- 43: orifice
- 44: valve body
- 45: solenoid
- 46: casing
- 47: coil
- 48: plunger
- 49: spring It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The present invention relates to a hydrogen fuel supply control apparatus for a fuel cell system, which provides an efficient hydrogen recirculation system, by utilizing a configuration with a combination of a jet pump and a proportional control solenoid valve embodied as a unit for supplying hydrogen gas and hydrogen recirculation gas to an anode of a fuel cell stack, and distinctively applying a proportional control method and a pulse flow control method with respect to the hydrogen supply flow as a control method of the proportional control solenoid valve according to output sections.

Hereinafter, exemplary embodiments of the present invention will be described in detail with reference to the accompanying drawings.

Figure 2:
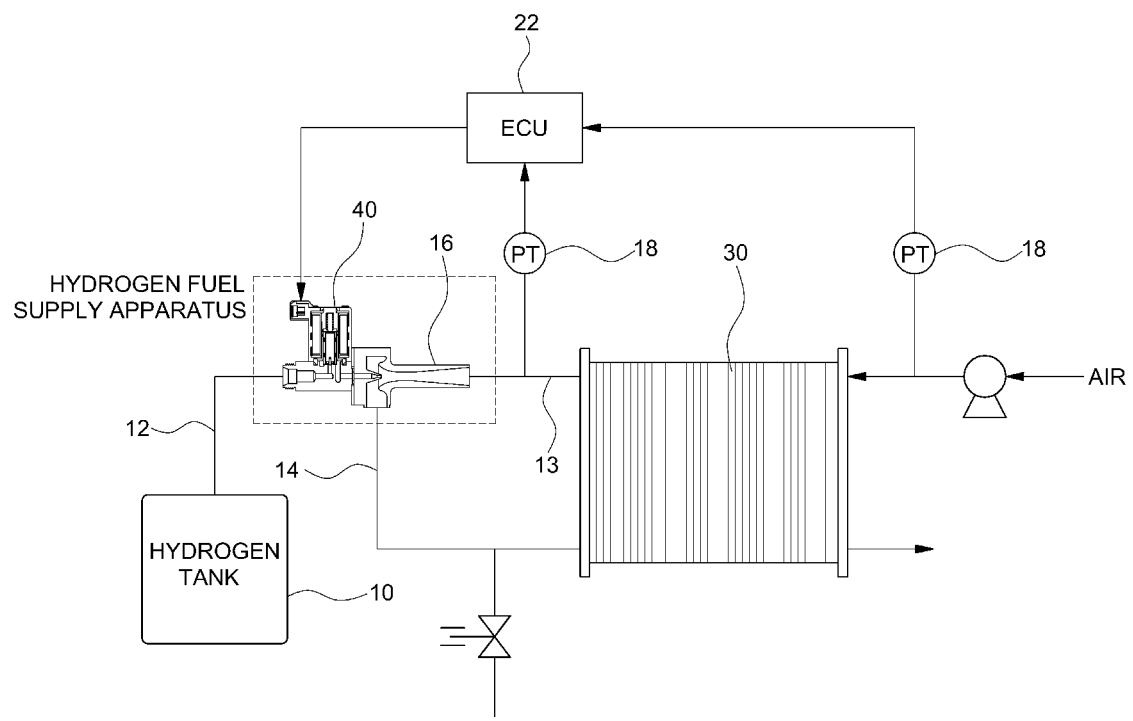
FIG. 2 is a view illustrating an apparatus for controlling hydrogen supply of a fuel cell system according to an exemplary embodiment of the present invention.

As shown in FIGS. 1 and 2, a fuel supply system of a fuel cell system may include a hydrogen supply line 12 connected to a hydrogen storage tank 10, a hydrogen recirculation line 14 for recirculating hydrogen that does not react in the fuel cell stack, and a jet pump (e.g., an ejector) 16 disposed between the hydrogen supply line 12 and the hydrogen recirculation line 14. The jet pump 16 pumps the new hydrogen and recirculated hydrogen to an anode of the fuel cell stack. The jet pump 16 is configured to inject compressed hydrogen supplied from a hydrogen tank at a high pressure, i.e., new hydrogen, to a stack inlet 13 through a nozzle 26 while at the same time generating vacuum. In this case, due to the generated vacuum, unreacted hydrogen discharged from the fuel cell stack may be suctioned through a recirculation hydrogen inlet 28 to be recirculated into the stack together with new hydrogen via a recirculation hydrogen inlet 28.

In an exemplary embodiment of the present invention, a proportional control solenoid valve 40 may be disposed at an inlet of the jet pump 16 within a flow passage between the jet pump 16 and the hydrogen tank 10 to change the pressure at the inlet of the nozzle 26 of the jet pump 16 and control the hydrogen supply flow. The proportional control solenoid valve 40 may be configured to control the hydrogen supply flow by varying an area of an effective orifice through which new hydrogen is passed by vertical movement of a plunger therein and changing the inlet pressure of the nozzle 26 of the jet pump 16. Also, the jet pump 16 may be configured to inject hydrogen gas in high concentration which has passed through the proportional control solenoid valve 40 at a high speed through the nozzle 26. Accordingly, when hydrogen is discharged through the jet pump 16, a vacuum may be generated due to the low pressure around the nozzle 26. In this case, unreacted hydrogen gas discharged from a stack outlet may be suctioned back into the system by the generated vacuum.

As shown in FIG. 1 the proportional control solenoid valve may include a valve body 44 disposed in a horizontal direction and a solenoid 45 disposed on the valve body 44 in a vertical direction respectively. The valve body 44 may include an inlet 41 for receiving hydrogen fuel at one side thereof and an outlet 42 aligned with the inlet of the nozzle 26 of the jet pump 16 at the other side thereof. An orifice 43 may be disposed within the center portion of the valve body 44 to communicate fluid between the inlet 41 and the outlet 42 and allow hydrogen from the hydrogen tank 10 to pass.

The solenoid disposed on the upper or top surface of the valve body 44 in the vertical direction may include a coil 47 disposed on the inner circumference of a casing 46, a plunger 48 disposed inside the coil 47 to vary the area of the orifice 43 by rising and falling according to a current application supplied from the coil 47, and a spring 49 disposed within an upper portion/section of the casing 46 to elastically support the plunger 48.

As shown in FIG. 1, the plunger inside the solenoid may be configured to rise and fall in the gravitational direction. In the case of the jet pump supplying fuel in a direction perpendicular to the gravitation direction, the solenoid may be disposed perpendicularly to the fuel supply direction, and thus abrasion or noise that may be generated by a difference between the gravitational direction and the plunger driving direction can be prevented.

On the other hand, although not shown in FIG. 1, a valve controller may be further provided in the hydrogen fuel supply control apparatus for the fuel cell system to control the opening and closing operation of the proportional control solenoid valve 40. The ECU 22 shown in FIG. 2 may serve as a valve controller to control the operation of the proportional control solenoid valve 40.

Figure 9A:
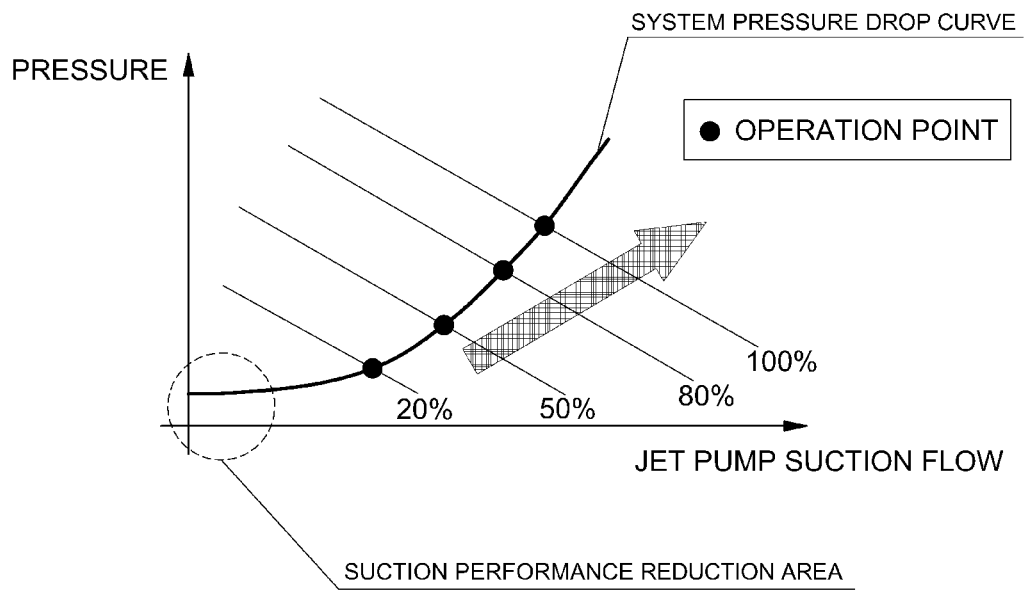
FIGS. 9A and 9B are graphs illustrating a hydrogen fuel supply flow in a typical hydrogen supply control apparatus for a fuel cell system.
Figure 9B:
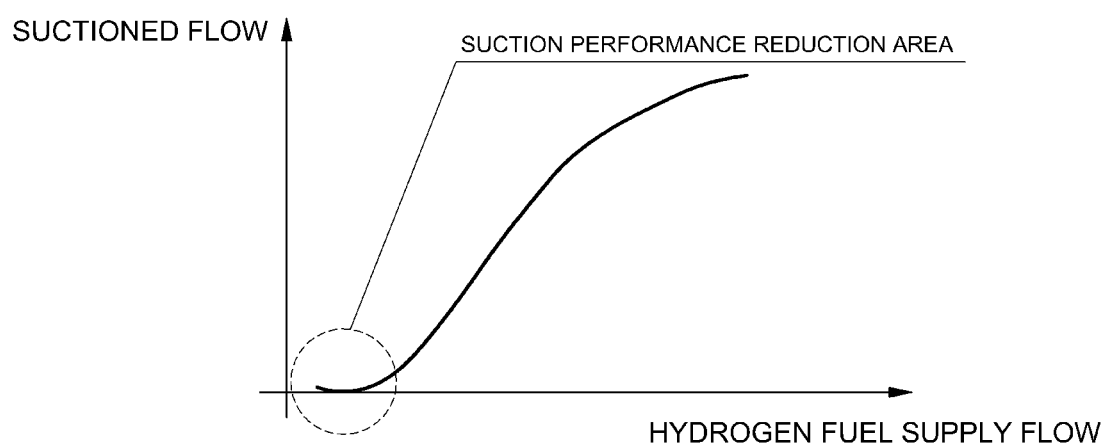

The valve controller may serve to prevent the difficulty related to securing hydrogen recirculation flow due to reduction of suction performance during a lower power sections or applications as shown in FIG. 9. For this, the valve controller may control the opening and closing of the valve by distinguishing the operation state according to the degree of the power of the fuel cell system, and applying predetermined electrical signals to the proportional control solenoid valve as a control input according to the operation state.

Specifically, the valve controller may utilize a pulse flow control method in which current is applied to the valve to supply (for a short time) the quantity of hydrogen necessary for the stack during a low power section where the suction performance is reduced and then the current application to the valve may be blocked to stop the hydrogen supply for the rest of time.

The pulse flow control method means controlling enough hydrogen to be supplied for a very short time through a proportional control valve to supply hydrogen fuel flow necessary for a low load operation condition to efficiently exist. Such a pulse flow control may be achieved by controlling time and current applied to the proportional control valve. By comparing a predetermined reference power with a current power of the fuel cell system, the valve controller may be configured to perform a typical valve proportional control when the current power is equal to or greater than the reference power, and perform valve control according to the pulse flow control method when the current power is less than the reference power.

Accordingly, in the hydrogen fuel supply control apparatus for the fuel cell system, the jet pump may be repetitively operated in a section showing a relatively high efficiency, through the pulse flow control method even during lower power situations/sections.

Hereinafter, a method for controlling hydrogen fuel supply control apparatus for the fuel cell system, including the jet pump, proportional control solenoid valve, and the valve controller, will be described in detail.

Figure 5:
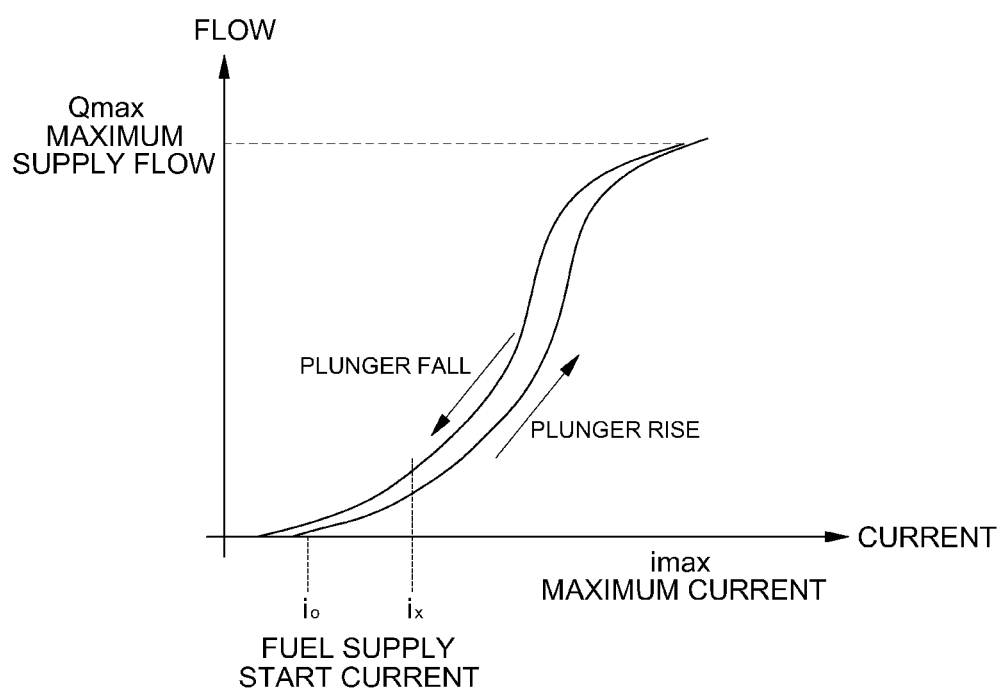
FIG. 5 is a graph illustrating a fuel flow control characteristics curve of a proportional control solenoid valve of a hydrogen supply control apparatus for a fuel cell system according to an exemplary embodiment of the present invention.

As shown in a fuel flow control characteristics curve of FIG. 5, the proportional control solenoid valve 40 may precisely control the hydrogen fuel supply from the hydrogen tank 10 and control the inlet pressure of the nozzle 26 of the jet pump 16 according to the hydrogen fuel supply, by varying the cross-sectional area of the orifice 43 while the plunger 48 moves upward and downward according to the magnitude of a current applied to the coil 47.

For example, when the current applied to the coil 47 of the proportional control solenoid valve 40 is less than a hydrogen fuel supply start current, the valve is closed. In other words, the plunger 48 blocks the orifice 43, and thus hydrogen fuel cannot be supplied to the jet pump 16. Alternatively, when a larger current is gradually applied, the plunger 48 may gradually rise, and the cross-sectional area of the orifice 43 may increase to allow the hydrogen fuel supply to gradually increase. When the applied current is reduced at the maximum supply, the plunger 48 may gradually fall, and the cross-sectional area of the orifice 43 and the hydrogen supply flow may be reduced, thereby showing hysteresis characteristics.

Figure 3:
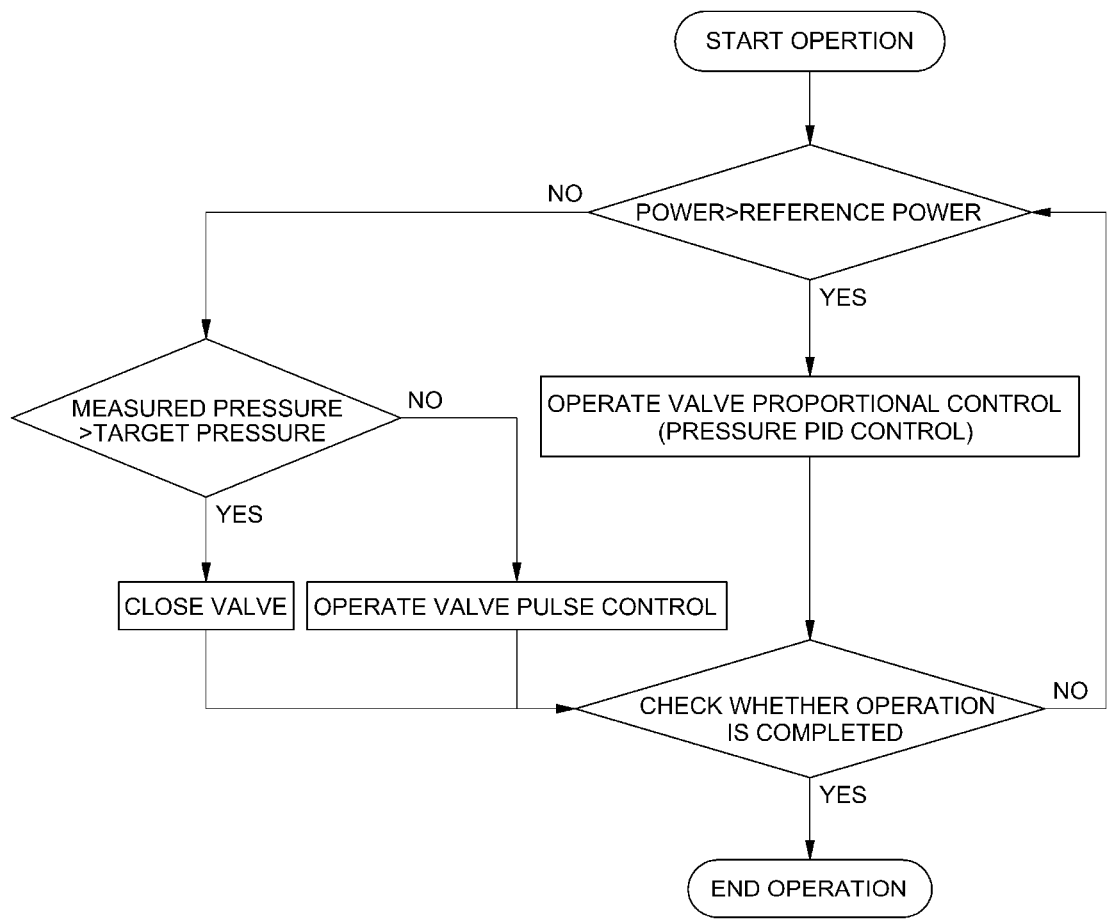
FIG. 3 is a flowchart illustrating a method for controlling a hydrogen supply control apparatus for a fuel cell system according to an exemplary embodiment of the present invention.
Figure 4:
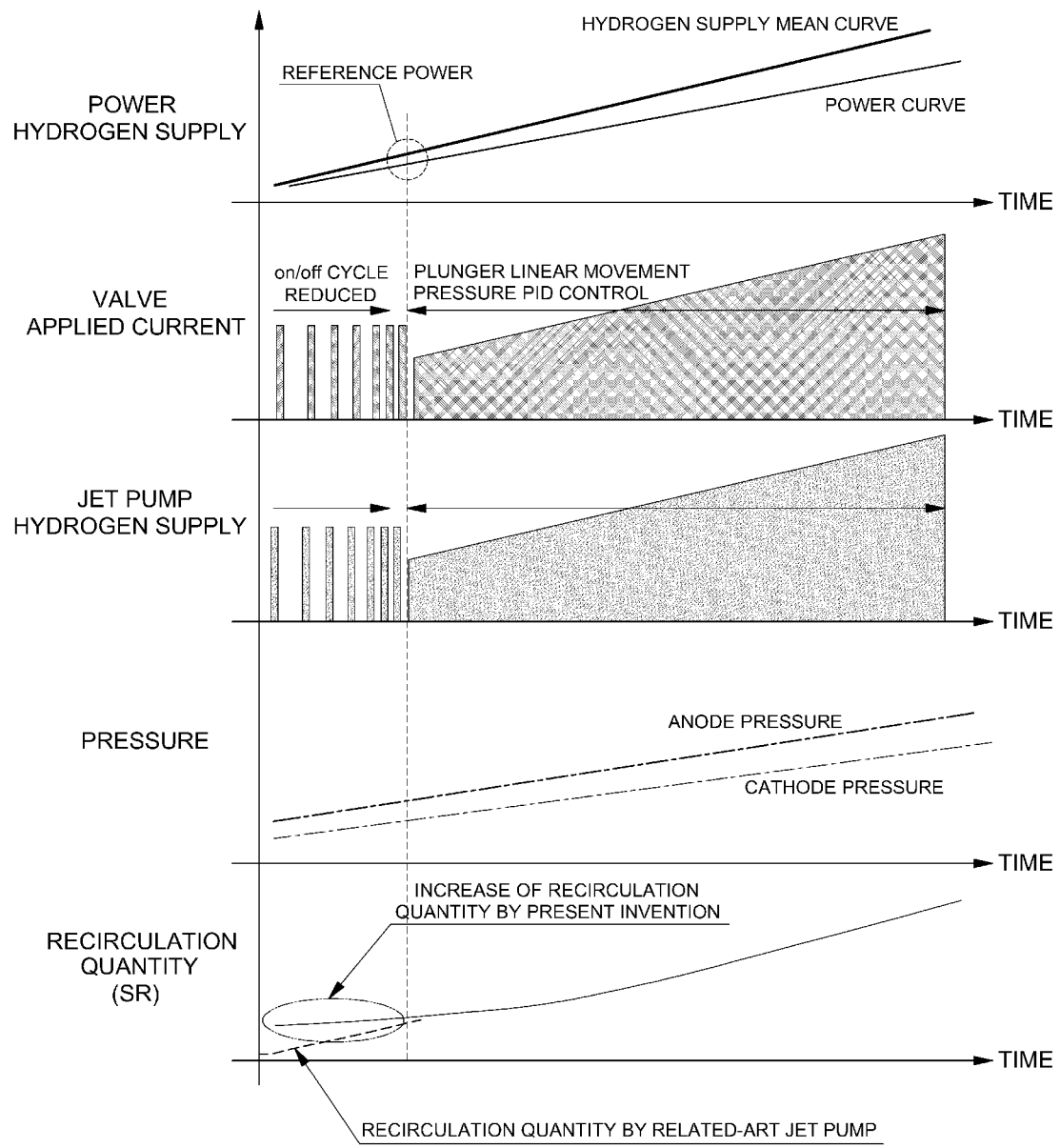
FIG. 4 is a graph illustrating a method for controlling a hydrogen supply control apparatus for a fuel cell system according to an exemplary embodiment of the present invention.

FIGS. 3 and 4 illustrate a method for controlling hydrogen fuel supply control apparatus for the fuel cell system. As shown in the flowchart of FIG. 3 and the graph of FIG. 4, the hydrogen fuel supply and the hydrogen supply pressure control may be performed using two cases according to the degree of the power with respect to the reference power.

In each case, as shown in the flowchart of FIG. 3, a processing of determining whether a current power section is a low power application may be first performed to select the control method by comparing a predetermined reference power with a current power. Thereafter, selective control may be performed according to whether the current power section is a lower power section or a high power section.

For example, as shown in FIG. 3, the reference power and the current power are compared with each other. When the current power is greater than the reference power, the current power section may be considered a high power section, and the proportional control may be performed on the valve. When the current power is equal to or less than the reference power, the current power section may be considered a lower power section, and the valve may operate according to the pulse flow control method. During the lower power section, the pressure may be measured and compared with a target pressure. When the measured pressure is lower than the target pressure, the valve may be closed. Only when the measured pressure is greater than the target pressure, may the pulse flow control be performed.

The hydrogen fuel supply control apparatus for the fuel cell system, as described in detail below, may be divided into controlling hydrogen supply at a low power of the fuel cell system by quickly turning on/off the proportional control solenoid valve 40 in a state where the proportional control solenoid valve 40 is disposed at the inlet of the jet pump 16, and a case of controlling the hydrogen supply at a high power of the fuel cell system by adjusting the vertical movement of the plunger 48 of the proportional control solenoid valve 40 to vary the cross-sectional area of the orifice 43 allowing hydrogen to pass through.

Hydrogen Supply Control at Low Power

In the operation of the fuel cell system, at a low power less than a reference power (e.g., predetermined value as a boundary line power between lower power, e.g., 5-30% of the total output, and preferably 10-20% of the total output) and high power hydrogen supply control may be performed by a pulse flow control method in which turning on/off of the proportional control solenoid valve 40 is quickly repeated.

Current equal to or greater than a fuel supply start current may be applied to the proportional control solenoid valve 40. In this case, as shown in FIG. 4, the current may be repeatedly applied at a high speed according to an optimal frequency to quickly and repeatedly turn on/off the proportional control solenoid valve 40. In other words, according to the on/off repetition of the current application to the coil 47 of the proportional control solenoid valve 40, the rise and fall of the plunger 48 may be repeated, and relative opening and closing of the orifice 43 may be repeated. By controlling the applied current of the proportional control solenoid valve 40 to turn on/off at the optimal frequency, as shown in the waveform, hydrogen fuel supply may be achieved in a form of pulse flow control, and hydrogen fuel may be injected through the nozzle 26 of the jet pump at a time interval to be supplied to the stack 30 via the stack inlet 13.

Simultaneously, when the hydrogen fuel is injected through the nozzle 26 of the jet pump 16, a vacuum may be generated on the side of the recirculation hydrogen inlet 28 of the jet pump 16 to allow unreacted hydrogen discharged from the fuel cell stack to be suctioned through the recirculation hydrogen inlet 28 and recirculated into the stack together with new hydrogen.

On the other hand, in the hydrogen fuel supply control apparatus for the fuel cell system, the on/off control of the proportional control solenoid valve 40 may be repeatedly performed until the hydrogen supply pressure reaches a predetermined target pressure. When the hydrogen supply pressure reaches the predetermined target pressure, the proportional control solenoid valve 40 may be closed. When the hydrogen supply pressure does not reach the predetermined target pressure, the proportional control solenoid valve 40 may be opened for a certain time to increase the inlet pressure of the nozzle according to an increase of hydrogen supply. Accordingly, as shown in FIG. 3, it is required to see whether the hydrogen supply pressure has reached the target pressure. Only when it has not reached the target pressure, may the pulse flow control be performed on the valve. Such a control method during a low power section can be implemented in a low-noise manner even though the on/off of the valve is performed at a high speed.

Specifically, when the on/off of the valve is repeated for a short cycle in a low power section, the plunger may hit against or impact an upper or lower portion of the internal valve assembly to repeatedly cause noise. In order to overcome such a limitation in this valve assembly, the proportional control solenoid valve may be used instead of the on/off valve, and the valve may be operated by the pulse flow control method.

Figure 6:
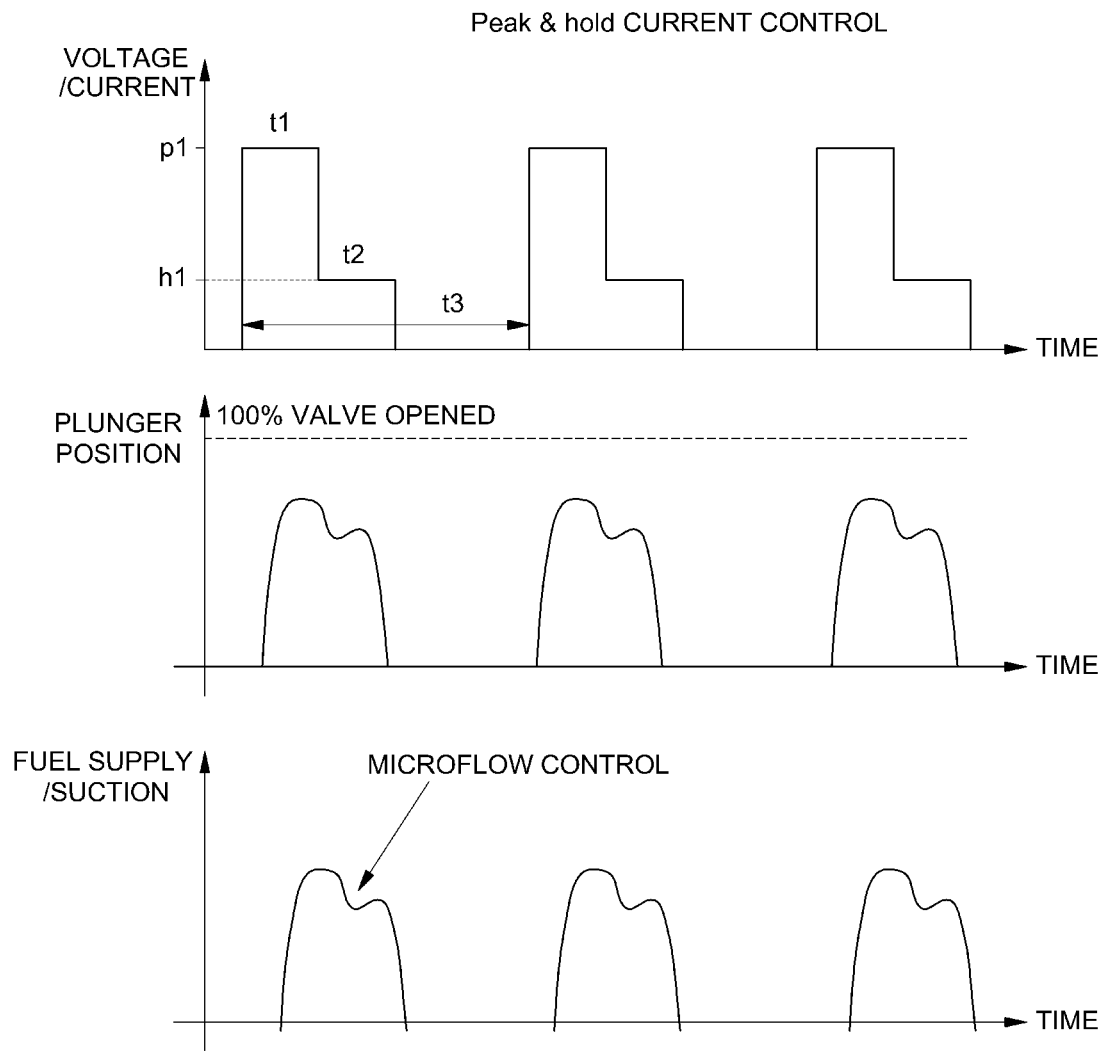
FIG. 6 is a graph illustrating a current control method with respect to a proportional control solenoid valve of a hydrogen supply control apparatus for a fuel cell system according to an exemplary embodiment of the present invention.
Figure 7:
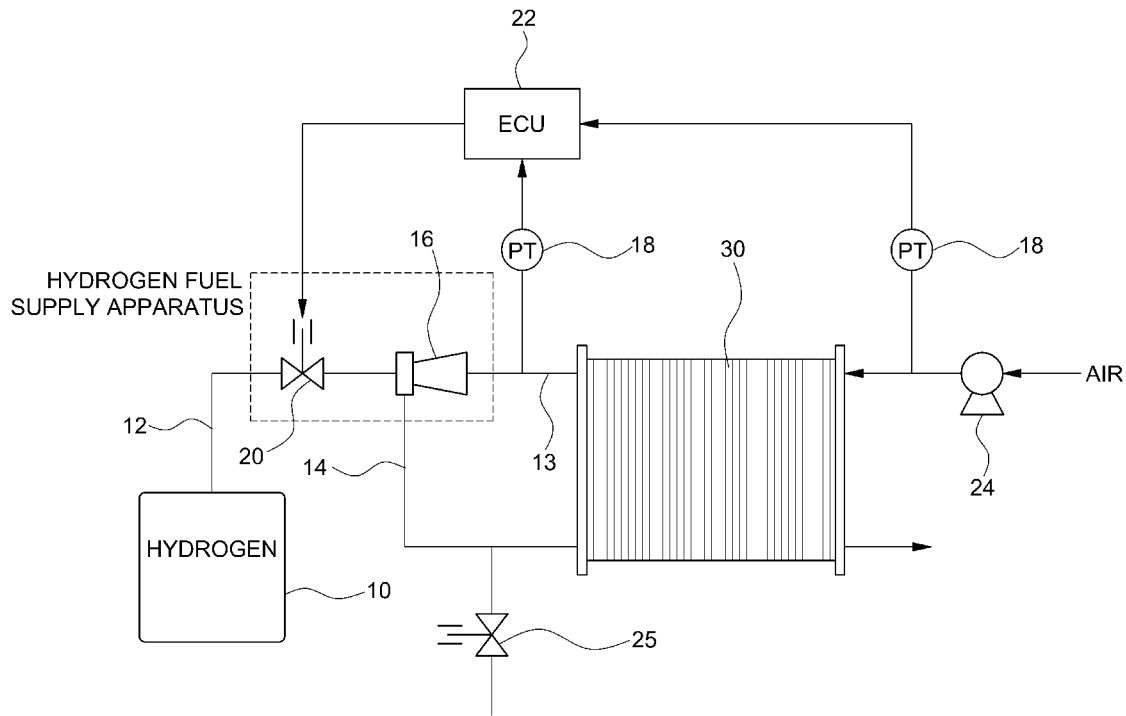
FIGS. 7 and 8 are views illustrating a typical hydrogen supply control apparatus for a fuel cell system.
Figure 8:
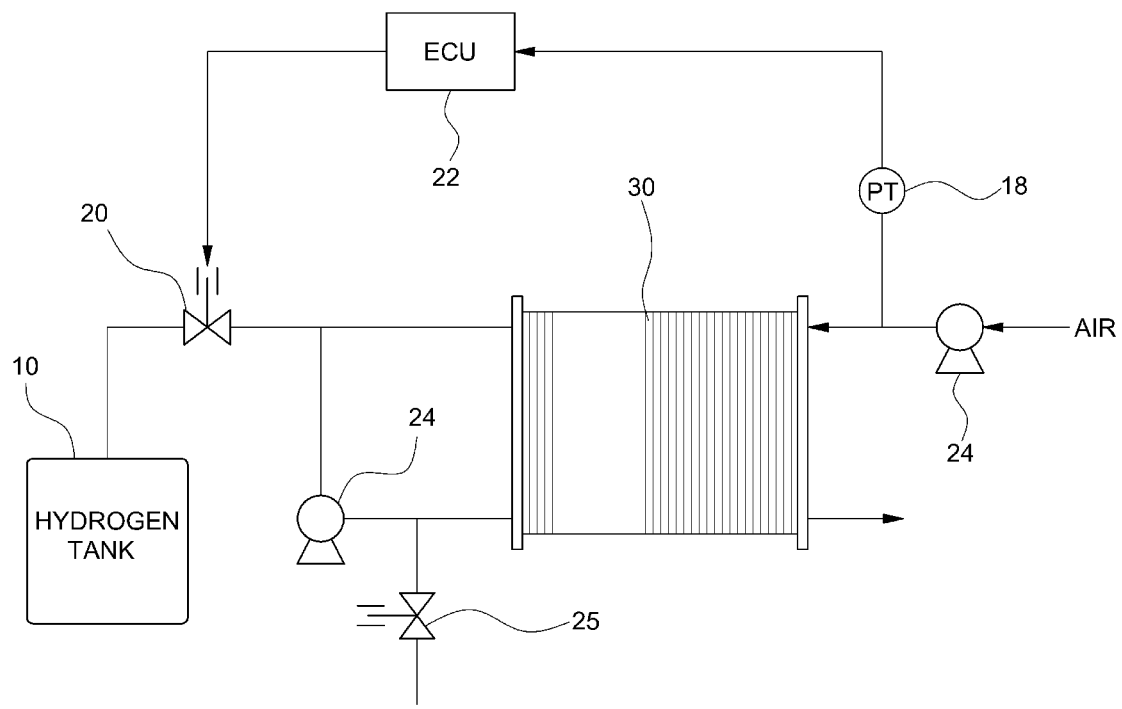

More specifically, in a hydrogen fuel supply control apparatus for a fuel cell system according to an exemplary embodiment of the present invention, for the pulse flow control at a low power section as described above, a current may be applied by a peak and hold method as shown in FIG. 6, and a peak current value and an application time may be controlled to allow the valve plunger not to reach the top of the internal valve assembly but reach only a point a predetermine distance below the top of the internal valve assembly. Accordingly, the valve plunger may be configured to not hit against an upper portion of the valve assembly, thereby preventing noise during a low power section.

Thus, a movement distance of the plunger may be reduced, thereby reducing the drop height of the plunger. Accordingly, an impulse generated by collision between a valve sheet surface and the plunger may be minimized, thereby reducing noise at the lower portion of the valve. By applying a hold current together with a peak current, a force in the opposite direction to the drop direction of the plunger during the drop of the plunger may be applied, thereby relatively reducing the falling speed of the plunger and thus additionally reducing noise caused by collision. A noise-absorbing member that is formed of a material capable of absorbing noise may be added on the valve sheet surface to completely prevent generation of noise.

In a hydrogen fuel supply control apparatus for the fuel cell system, a contact with the upper portion of the valve may be blocked at the plunger rising section, and the falling speed and falling height may be controlled at the plunger falling section, thereby significantly reducing noise caused by a contact with the lower portion of the valve.

Therefore, in a method for controlling the hydrogen fuel supply control apparatus for the fuel cell system, noise can be significantly reduced by controlling an applied current using the peak and hold control method at a low power section. In this case, the pulse flow control may be performed by adjusting the degree of the reduction of noise to a required level by appropriately controlling four parameters of the peak current value with respect to the applied current, the peak current application time, the hold current value, and the hold current application time.

Illustratively, reduction of durability and generation of noise due to abrasion may be prevented by matching the movement direction of the valve plunger with the gravitational direction, and noise may be completely prevented by adding a noise-absorbing member on the lower end of the valve plunger.

FIG. 6 illustrates a specific example of performing the peak and hold control. As shown in FIG. 6, in the peak and hold control, a certain peak current value (p1) may be applied for a certain peak current application time (t1), and then a certain hold current value (h1) may be applied for a certain hold current application time (t2). After a certain period of time (t3), according to a predetermined on/off cycle, the application of the peak current and the hold current may be repeated as described above. FIG. 6 shows fuel supply/suction flow graph and the plunger position graph of the proportional control solenoid valve controlled by the current control of the peak and hold method.

As shown in the plunger position graph of FIG. 6, the peak current is controlled such that the position of the plunger does not reach the top dead center corresponding to 100% opening. Also, it can be verified that the falling of the valve is being performed by stages and noise is being reduced.

Also, as shown in the fuel supply/suction flow graph, the hydrogen recirculation performance is improved by periodically providing the fuel supply/suction flow of a certain level or more even at a low power section.

Hydrogen Supply Control at High Power

On the other hand, the hydrogen supply control at higher power than the reference power may be performed by controlling both of the hydrogen supply pressure and quantity. The hydrogen supply pressure may be set by a proportional integral derivative control (PID) pressure control that performs control by calculating the difference between a target pressure for hydrogen supply and a stack inlet pressure. The hydrogen supply flow may be controlled by adjusting the rise and fall in the height of the plunger according to the set hydrogen supply pressure to vary the cross-sectional area of an orifice.

Accordingly, the cross-sectional area of the orifice 43 through which hydrogen passes may increase, and simultaneously hydrogen supplied from a hydrogen tank through the orifice 43 may linearly increase, by allowing the plunger 48 of the proportional control solenoid valve 40 to linearly rise and fall, according to the hydrogen supply pressure set by the PID pressure control, Simultaneously, when hydrogen fuel is continuously injected through the nozzle 28 of the jet pump 16, vacuum may be generated at the side of the recirculation hydrogen inlet 28 of the jet pump 16. Accordingly, unreacted hydrogen discharged from the fuel cell stack may be easily suctioned through the recirculation hydrogen inlet 28, and may be recirculated into the stack together with new hydrogen. Thus, noise can be prevented by controlling hydrogen flow with linear movement of the plunger of the proportional control solenoid valve, and hydrogen recirculation can be easily achieved because hydrogen fuel supply injected through the jet pump is sufficient.

The present invention has the following advantages.

According to the exemplary embodiments, since fuel supply is performed by a pulse flow control method during a lower power operation of a fuel cell system, and the suctioning performance of recirculation gas of a jet pump (ejector) is maximized, enough recirculation flow can be secured even at a low power operation. For example, a lower power required to enable the above is in the range of 5-30% of the total output, preferably 10-20% of the total output. Also, since a plunger does not generate a strong shock and compress gas due to the characteristics of a proportional control valve, noise is not significantly generated.

Additionally, since the rise and fall operation of a valve plunger can be controlled in stages by adjusting a peak current and a hold current using a valve controller, general noise can be significantly inhibited to provide silent driving performance. Furthermore, valve proportional control (e.g., PID pressure control) is performed by calculating the difference between a target pressure for hydrogen supply and a stack inlet pressure when hydrogen supply is controlled at a high power section. In this case, the quantity of hydrogen necessary for a stack can be supplied, and a jet pump can be operated showing the optimal performance. Accordingly, enough suctioned flow of recirculation hydrogen can be achieved.

Accordingly, in an apparatus for controlling hydrogen supply of a fuel cell system and a method for controlling the same, efficient hydrogen recirculation system can be achieved by connecting a proportional control solenoid valve to a jet pump and controlling the same according to a reference output, without additional components such as a blower or a plurality of jet pumps The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for controlling hydrogen supply of a fuel cell system, comprising:
    a jet pump disposed and directly connected to an inlet of a fuel cell stack and configured to supply and recirculate hydrogen into the fuel cell stack;
    a proportional control solenoid valve connected to a hydrogen supply line and fluidly communicating with a nozzle inlet within the jet pump to control the hydrogen supply to the jet pump; and
    a controller connected with the proportional control solenoid valve, wherein the controller is programmed to control an operation of the proportional control solenoid valve based on an amount of power requested from the fuel cell system, wherein the controller controls the operation of the proportional control solenoid valve by repeatedly turning on and off the proportional control solenoid valve during a low power section in which a current power is less than a predetermined reference power.

2. The apparatus of claim 1, wherein the controller controls the operation of the proportional control solenoid valve according to a proportional control method during a high power section in which the current power is greater than the predetermined reference power.

3. The apparatus of claim 2, wherein the control during the high power section is performed by a proportional integral derivative control (PID) pressure that calculates a difference between a target pressure for the hydrogen supply and a stack inlet pressure.

4. The apparatus of claim 1, wherein control during the low power section comprises controlling a fuel supply by applying a peak current and a hold current to the proportional control solenoid valve according to a peak and hold control method.

5. The apparatus of claim 4, wherein, in the control performed at the low power section by the peak and hold control method, the fuel supply is controlled by changing at least one of a peak current value, a peak current application time, a hold current value, and a hold current application time.

6. The apparatus of claim 1, wherein the proportional control solenoid valve comprises a valve plunger that operates in a gravitational direction, and a noise-absorbing member is added to a lower end of the valve plunger or a value body colliding with the valve plunger.

* * * * *